United States Patent
Kodde

(10) Patent No.: US 8,187,365 B2
(45) Date of Patent: May 29, 2012

(54) PROCESS FOR REMOVAL OF METAL CARBONYLS FROM A SYNTHESIS GAS STREAM

(75) Inventor: Adriaan Johannes Kodde, Amsterdam (NL)

(73) Assignee: Shell Oil Company, Houston, TX (US)

( * ) Notice: Subject to any disclaimer, the term of this patent is extended or adjusted under 35 U.S.C. 154(b) by 511 days.

(21) Appl. No.: 12/442,859

(22) PCT Filed: Sep. 26, 2007

(86) PCT No.: PCT/EP2007/060189
§ 371 (c)(1), (2), (4) Date: Jun. 11, 2009

(87) PCT Pub. No.: WO2008/037726
PCT Pub. Date: Apr. 3, 2008

(65) Prior Publication Data
US 2010/0005965 A1    Jan. 14, 2010

(30) Foreign Application Priority Data
Sep. 27, 2006 (EP) .................................. 06121322

(51) Int. Cl.
*B01D 53/02* (2006.01)
(52) U.S. Cl. .......................................... 95/133; 95/148
(58) Field of Classification Search .............. 95/133, 95/148, 234, 235; 96/134; 585/800, 820
See application file for complete search history.

(56) References Cited

U.S. PATENT DOCUMENTS

| | | | |
|---|---|---|---|
| 1,535,802 A | 4/1925 | Bendixen | |
| 3,294,706 A * | 12/1966 | Constabaris et al. | 502/25 |
| 3,361,780 A * | 1/1968 | Whiting | 556/60 |
| 3,498,749 A * | 3/1970 | Aldridge | 423/149 |
| 4,202,167 A | 5/1980 | Suggitt et al. | 60/39.02 |
| 4,478,798 A | 10/1984 | Karwat | 423/224 |
| 4,624,841 A * | 11/1986 | Hidaki | 423/359 |
| 5,077,026 A * | 12/1991 | Nair et al. | 423/326 |
| 5,451,384 A | 9/1995 | Carr | 423/410 |
| 5,897,686 A * | 4/1999 | Golden et al. | 95/99 |
| 6,042,796 A * | 3/2000 | Snow | 423/210 |
| 6,077,487 A * | 6/2000 | Snow | 423/210 |
| 6,165,428 A | 12/2000 | Eijkhoudt et al. | 423/210 |
| 7,918,922 B2 * | 4/2011 | Gouman et al. | 95/93 |

FOREIGN PATENT DOCUMENTS

| | | |
|---|---|---|
| DE | 3941766 | 6/1991 |
| EP | 239111 | 9/1987 |
| EP | 571820 | 12/1993 |
| WO | WO0002644 | 1/2000 |

OTHER PUBLICATIONS

Golden et al: Removal of Trace Iron and Nickel Carbonyls by Adsorption, Industrial & Engineering Chemistry Research, ACS, vol. 30, 1991, pp. 502-507.

* cited by examiner

*Primary Examiner* — Duane Smith
*Assistant Examiner* — Christopher P Jones
(74) *Attorney, Agent, or Firm* — Charles W. Stewart

(57) ABSTRACT

The invention provides a process for removal of metal carbonyls from a synthesis gas stream comprising metal carbonyls, the process comprising the steps of: (a) adsorption of metal carbonyls by contacting the synthesis gas stream with solid adsorbent comprising activated carbon and/or hydrophobic zeolite to obtain solid adsorbent enriched in metal carbonyls and a synthesis gas stream depleted of metal carbonyls; (b) desorption of metal carbonyls by contacting the solid adsorbent enriched in metal carbonyls with CO-containing gas comprising at least 0.5 volume % CO to obtain regenerated adsorbent depleted of metal carbonyls and CO-containing gas enriched in metal carbonyls, wherein the temperature at which metal carbonyl desorption takes place is higher than the temperature at which metal carbonyl adsorption takes place.

15 Claims, No Drawings

PROCESS FOR REMOVAL OF METAL CARBONYLS FROM A SYNTHESIS GAS STREAM

The present application claims priority from European Patent Application 06121322.9 filed 27 Sep. 2006.

The invention relates to a process for removing metal carbonyls from a synthesis gas stream.

Synthesis gas streams are gaseous streams mainly comprising carbon monoxide and hydrogen and further usually containing carbon dioxide, while also nitrogen, nitrogen-containing components (such as HCN and $NH_3$), metal carbonyls and steam may be present, as well as hydrogen sulphide, carbonyl sulphide and carbonyl disulphide.

Synthesis gas streams may be produced via partial oxidation or steam reforming of hydrocarbons including natural gas, distillate oils and residual oil, and by gasification of coal or coke. During the production of synthesis gas, not only carbon monoxide and hydrogen are formed but also amounts of hydrogen sulphide and, albeit in smaller quantities, carbonyl compounds of nickel and iron. Under conditions prevailing in gasification plants further metal carbonyls are formed as a result of reaction of carbon monoxide with iron and nickel surfaces and/or with iron and nickel present in the hydrocarbonaceous feedstock to give the corresponding metal carbonyls. Iron pentacarbonyl is often formed by the reaction of carbon monoxide with steel materials in the process equipment. Metal carbonyls can also be formed when gases are transported or stored in metal containers. Nickel tetracarbonyl and iron pentacarbonyl, especially in combination with hydrogen sulphide, can cause serious problems during treatment or use of synthesis gas, mainly due to thermal and/or chemical decomposition.

Synthesis gas streams are used in many ways in industrial processes. For example, synthesis gas streams can be used for the generation of electricity via a gas turbine fired on synthesis gas. Removal of sulphur compounds is required to prevent or reduce emission of SOx and meet environmental specifications. Another use of synthesis gas streams is for the production of hydrogen via the so-called water gas shift reaction.

Metal carbonyls, in particular nickel tetracarbonyl and iron pentacarbonyl, in combination with hydrogen sulphide, are prone to thermal and/or chemical decomposition to metal sulphides. These metal sulphides can deposit on process equipment, leading to fouling and/or plugging in the process where the synthesis gas stream is used.

Therefore, it is important to remove metal carbonyls effectively from gaseous streams, preferably to levels below 1 ppmv or even below 0.1 ppmv. Given the fact that during normal operation of a gasification plant several tons of iron pentacarbonyl and nickel tetracarbonyl per year are produced, the metal carbonyl problem is a sizeable one.

Processes for removal of metal carbonyls from a synthesis gas stream are known in the art. For example, in EP 0,239,111 a process for removing metal carbonyls from synthesis gas streams is described, using zinc oxide as adsorbent. The adsorption bed reduces the iron pentacarbonyl content of the gas stream by 99%, whereas the nickel tetracarbonyl content of the gas stream is lowered by 77% only. This may indicate a relatively low adsorption capacity for nickel tetracarbonyl and/or a contact time limitation and as a consequence forms a constraint on the use of this adsorbent. Furthermore, the process results in a spent zinc sulphide adsorbent, containing metal carbonyls, that needs to be disposed of. In addition, the need to regularly replace the adsorbent results in limited on-stream time, requires additional organisational and technical measures and increases the overall cost of the process.

In U.S. Pat. No. 1,535,802 a process for metal carbonyl removal is described wherein activated alumina is used. A disadvantage of this process is that removal of metal carbonyls to levels below 1 ppmv, or even below 0.1 ppmv cannot be achieved.

There remains a need in the art for a reversible process for the removal of metal carbonyls from a synthesis gas stream, especially from a synthesis gas stream comprising sulphur compounds, enabling removal to levels below 1 ppmv. It has now been found that reversible adsorption of metal carbonyls can be done using a solid adsorbent, and using a CO-containing gas to regenerate the adsorbent.

Thus, the invention provides a process for removal of metal carbonyls from a synthesis gas stream, the process comprising the steps of:

(a) adsorption of metal carbonyls by contacting the synthesis gas stream with solid adsorbent comprising activated carbon and/or hydrophobic zeolite to obtain solid adsorbent enriched in metal carbonyls and a synthesis gas stream depleted of metal carbonyls;

(b) desorption of metal carbonyls by contacting the solid adsorbent enriched in metal carbonyls with CO-containing gas comprising at least 0.5 volume % CO to obtain regenerated adsorbent depleted of metal carbonyls and CO-containing gas enriched in metal carbonyls, wherein the temperature at which metal carbonyl desorption takes place is higher than the temperature at which metal carbonyl adsorption takes place.

The process enables removal of metal carbonyls to levels below 1 ppmv. Even removal of nickel tetracarbonyl, which is considered to be more difficult than for example removal of iron pentacarbonyl, is possible to levels below 1 ppmv. Further, as desorption can be done using mild conditions, the process enables reversible adsorption using a temperature swing. As there is no need for frequent replacement of spent adsorbent, operating procedures of the process are considerably simplified. In addition, the process is environmentally friendly as well as cost-saving.

The process is particularly suitable for removal of metal carbonyls selected from the group of iron pentacarbonyl, nickel tetracarbonyl and cobalt carbonyl, especially from synthesis gas obtained from the partial oxidation of coal and/or liquid hydrocarbons.

Adsorption of metal carbonyls takes place by contacting the synthesis gas stream comprising metal carbonyls with solid adsorbent comprising activated carbon and/or hydrophobic zeolite.

The choice of adsorbent depends inter alia on the type of metal carbonyls to be removed. Without wishing to be bound by any specific observation, it has been found that iron pentacarbonyl gives a stronger adsorption on the solid adsorbent compared to nickel tetracarbonyl. It has also been observed that desorption of iron pentacarbonyl is more difficult than desorption of nickel tetracarbonyl.

Thus, adsorption of nickel tetracarbonyl in the presence of iron pentacarbonyl will be more difficult. In the event that the metal carbonyls include nickel tetracarbonyl, it is preferred to use solid adsorbent comprising activated carbon. It has been found that adsorption of nickel tetracarbonyl using solid adsorbent comprising activated carbon can be effected better compared to adsorption from solid adsorbent comprising hydrophobic zeolite. This allows for a better removal of nickel tetracarbonyl. Thus, in a preferred embodiment the metal carbonyls include $Ni(CO)_4$ and the solid adsorbent comprises activated carbon.

In the event that the metal carbonyls include iron pentacarbonyl, it is preferred to use solid adsorbent comprising a hydrophobic zeolite. It has been found that desorption of iron pentacarbonyl from solid adsorbent comprising hydrophobic zeolite can be achieved more easily compared to desorption of iron pentacarbonyl from solid adsorbent comprising activated carbon. This allows for regeneration at milder conditions. Thus, in a preferred embodiment the metal carbonyls include $Fe(CO)_5$ and the solid adsorbent comprises a hydrophobic zeolite.

In the event that the metal carbonyls include iron pentacarbonyl and nickel tetracarbonyl, it is preferred to use a solid adsorbent comprising hydrophobic zeolite and activated carbon. Preferably, the solid adsorbent comprises a layer of hydrophobic zeolite adsorbent and a layer of activated carbon. In this embodiment, preferably the first layer, meaning the layer with which the synthesis gas stream comprising metal carbonyls is first contacted, is a layer comprising hydrophobic zeolite and the second layer is a layer comprising activated carbon. It will be understood that the invention also includes the use of alternating layers of hydrophobic zeolite and activated carbon for removal of metal carbonyls.

For the purpose of this invention, the term "hydrophobic zeolite" refers to a hydrophobic zeolite which only weakly adsorbs water. Suitable hydrophobic zeolites adsorb less than 25 kg $H_2O$/100 kg of dry adsorbent (25° C., water vapour pressure 0.1 kpa), more suitably less than 10 kg $H_2O$/100 kg dry adsorbent. Particular good results are obtained when between 0.001 and 5 kg $H_2O$/100 kg dry adsorbent is adsorbed, especially between 0.01 and 3 kg $H_2O$/100 kg dry adsorbent. Preferably between 0.1 and 2 kg $H_2O$/100 kg dry adsorbent is adsorbed.

The hydrophobic zeolite may be a hydrophobic microporous oxide, as described in U.S. Pat. No. 6,165,428, which patent is incorporated herein by reference.

Hydrophobic zeolite adsorbents containing micro pores having sizes in the range of 0.55 and 4 nm are especially preferred.

Preferably, the porous hydrophobic zeolite adsorbent comprises silica and/or alumina. More preferably, a Si and/or Al containing zeolite is used having a silica/alumina ratio at least 25 and an accessible pore volume for pore sizes between 0.55 and 2 nm of at least 0.02 ml/g. When using these adsorbents, adsorption of especially iron pentacarbonyl is better.

The adsorption conditions depend inter alia on the type and the amount of metal carbonyl to be removed.

Suitably, adsorption of metal carbonyls is performed at a pressure in the range of from 1 to 80 bara, preferably from 15 to 70 bara, more preferably from 20 to 60 bara.

Suitably, the adsorption is performed at relatively low temperature, preferably in the range of from 10 to 150° C., more preferably from 10 to 100° C., still more preferably from 20 to 50° C. At the preferred temperature ranges, the adsorption capacity of the solid adsorbent, especially for nickel tetracarbonyl, is higher. This results in a better removal of nickel tetracarbonyl.

Adsorption of metal carbonyls results in solid adsorbent enriched in metal carbonyls and a synthesis gas stream depleted of metal carbonyls.

Desorption of metal carbonyls from the solid adsorbent enriched in metal carbonyls takes place by contacting the solid adsorbent enriched in metal carbonyls with a CO-containing gas. The desorption conditions depend on the type of adsorbent and the type of metal carbonyl adsorbed thereon. It has been found that by using CO-containing gas, desorption of nickel tetracarbonyl from hydrophobic zeolite adsorbent and/or from activated carbon and desorption of iron pentacarbonyl from hydrophobic zeolite can be effected using mild conditions. The additional advantage of using a CO-containing gas for desorption is that synthesis gas may be used, either partly or wholly, as CO-containing gas.

The CO-containing gas comprises at least 0.5 volume % CO. It has been found that CO-containing gases comprising less than 0.5 volume % CO, for example nitrogen or hydrogen of laboratory and/or utility grade, comprising only trace amounts of CO, do not result in a sufficient desorption of metal carbonyls from the solid adsorbent.

For desorption of nickel tetracarbonyl from hydrophobic zeolite adsorbent and/or from activated carbon and/or for desorption of iron pentacarbonyl from hydrophobic zeolite preferably the CO-containing gas comprises in the range of from 1 to 100 volume % CO, more preferably from 5 to 100 volume % CO, based on the total CO-containing gas.

For desorption of iron pentacarbonyl from activated carbon, preferably the CO-containing gas comprises in the range of from 70 to 100 volume % CO, more preferably from 80 to 100 volume % CO, based on the total CO-containing gas.

At these preferred CO percentages a better desorption rate is achieved, resulting in faster desorption to achieve regenerated solid adsorbent that can be used again to remove metal carbonyls from a synthesis gas stream comprising metal carbonyls.

The temperature at which metal carbonyl desorption takes place is higher than the temperature at which metal carbonyl adsorption takes place. It has been found that the desorption can be done especially well when the temperature at which metal carbonyl desorption takes place is in the range of from from 5° C. to 175° C. higher, preferably from 20° C. to 110° C. higher than the temperature at which metal carbonyl adsorption takes place.

The choice of desorption temperature to be applied will depend on the type of metal carbonyls to be desorbed in combination with the type of adsorbent used. Suitably, the desorption temperature is in the range of from 50 to 200° C.

For desorption of nickel tetracarbonyl from hydrophobic zeolite adsorbent and/or from activated carbon and/or for desorption of iron pentacarbonyl from hydrophobic zeolite, preferably the desorption temperature is in the range of from 50 to 160° C., preferably from 50 to 150° C.

For desorption of iron pentacarbonyl from activated carbon, preferably the desorption temperature is in the range of from 100 to 200° C.

At these preferred temperature ranges, desorption proceeds at a favourable rate and results in solid adsorbent having low levels of metal carbonyls and thus being suitable for removal of metal carbonyls from a synthesis gas stream.

The desired desorption temperature can for example be achieved by heating up the desorption zone, either externally or internally. An efficient way is by using hot CO-containing gas. It will be understood that the temperature of the hot CO-containing gas is preferably somewhat higher than the desired temperature at which desorption should take place, so that loss of heat during heat transfer will still enable reaching the desired temperature. Thus, preferably the temperature of the CO-containing gas is in the range of from 60 to 210° C., more preferably from 60 to 170° C.

In a preferred embodiment, the solid adsorbent is contained in a solid adsorbent bed. It will be understood that embodiments with two or more adsorbent beds are also comprised in the invention. The use of two or more solid adsorbent beds enables a continuous process, as one or more adsorbent bed can be in adsorption mode, meaning that they are used for adsorbing metal carbonyls, while the other adsorbent beds can be in desorption mode, meaning that adsorbed metal carbonyls are desorbed.

The process results in a synthesis gas stream depleted of metal carbonyls. Suitably, the synthesis gas stream depleted of metal carbonyls comprises less 1 ppmv of metal carbonyls, based on the total synthesis gas stream. The synthesis gas depleted of metal carbonyls produced in the process is particularly suitable for use as feedstock for a hydrogen plant or for use in a gas turbine fired on synthesis gas for generation of electricity. Therefore the present invention also relates to these respective uses.

In some instances, it can be desirable to have a completely regenerative process, including destruction of metal carbonyls present in the regeneration gas. Thus, preferably the process further includes removal of metal carbonyls removed from the CO-containing gas enriched in metal carbonyls. The CO-containing gas stream enriched in metal carbonyls is much smaller that the synthesis gas stream. Thus, destroying metal carbonyls in the CO-containing gas enriched in metal carbonyls, even when involving heating/cooling or conditioning such as wetting and/or desulphurisation is much easier and more economical to accomplish compared to destruction of metal carbonyls from the synthesis gas stream. Destruction of metal carbonyls present in the regeneration gas may be done in various ways.

In a first embodiment metal carbonyls in the CO-containing gas enriched in metal carbonyls are destructed by contacting the CO-containing gas enriched in metal carbonyls with an oxidising agent, as for example described in U.S. Pat. No. 4,478,798. Preferably an oxidising agent selected from the group of $O_2$, $SO_2$, $N_2O$, $C_{12}$, $Br_2$, $I_2$, $O_3$ and $H_2O_2$ is used. The cheapest oxydising agent is an oxygen-containing gas, for example air or oxygen-enriched air or even pure oxygen. More vigorous gaseous oxidising agents such as $SO_2$, $N_2O$, $Cl_2$, $Br_2$, $I_2$ and $O_3$ can be also used. These compounds are more expensive and may give rise to additional operational and/or safety measures, but will result in a faster destruction of metal carbonyls. Alternativey, the CO-containing gas enriched in metal carbonyls can be contacted with an aqueous $H_2O_2$ solution, as for example described in EP 0,571,820. This is suitably done by introducing finely divided CO-containing gas enriched in metal carbonyls into an $H_2O_2$ solution. Thus, the contact area of the CO-containing gas enriched in metal carbonyls with the $H_2O_2$ is increased, leading to a better oxidation. Preferably, an aqueous $H_2O_2$ solution comprising from 0.5 to 15 wt %, more preferably from 1.0 to 10, most preferably from 1.5 to 5 wt % of $H_2O_2$, based on the total $H_2O_2$ solution, is used. These preferred $H_2O_2$ concentrations result in a better metal carbonyl destruction. After oxidation, the resulting metal oxides can easily be removed and disposed of.

In a second embodiment, metal carbonyls are removed from the CO-containing gas enriched in metal carbonyls by subjecting the CO-containing gas enriched in metal carbonyls to a water gas shift reaction, as for example described in U.S. Pat. No. 4,202,167 and in DE 3,941,766. The term "water gas shift reaction" refers to the conversion of CO and $H_2O$ to $H_2$ and $CO_2$, i.e. the catalytic reaction between carbon monoxide and water in which each molecule of carbon monoxide is replaced by a molecule of hydrogen according the following equation $CO + H_2O \rightarrow H_2 + CO_2$. The water gas shift reaction raises the temperature of the CO-containing gas to above about 315° C. and lowers the CO content of the gas. At this elevated temperature, metal carbonyls and especially nickel tetracarbonyls are destroyed.

In a third embodiment, metal carbonyls are removed from the CO-containing gas enriched in metal carbonyls by contacting the CO-containing gas enriched in metal carbonyls with solid adsorbent comprising a sulphide and/or an oxide, as for example described in EP 0,239,111. Zinc sulphide and/or zinc oxide are preferred. Suitably, the CO-containing gas enriched in metal carbonyls is contacted with solid adsorbent comprising zinc oxide and/or zinc sulphide for a period of time sufficient to reduce the metal carbonyl content. The solid adsorbent is then discarded.

In a fourth embodiment, metal carbonyls are removed from the CO-containing gas enriched in metal carbonyls by introducing the CO-containing gas enriched in metal carbonyls into a gasification unit. This embodiment is especially preferred when the synthesis gas is prepared via gasification of coal or coke in a gasification unit. Metal carbonyls can then simple be removed by directing the CO-containing gas enriched in metal carbonyls back to the same gasification unit where the synthesis gas stream comprising metal carbonyls originates from.

In a fifth embodiment, metal carbonyls are removed from the CO-containing gas enriched in metal carbonyls by heating the CO-containing gas enriched in metal carbonyls. Heating above a certain temperature results in the destruction of metal carbonyls. Preferably, the heating is done to a temperature above about 315° C. At a temperature above about 315° C., metal carbonyls and especially nickel tetracarbonyls are destroyed.

The invention will now be illustrated using the following non-limiting examples.

EXAMPLE 1

The requirement for CO-containing regeneration gas is illustrated in the following example. This experiment consisted of three consecutive stages:
Step I: adsorption.
Step II: regeneration using inert gas.
Step III: second regeneration by CO-containing gas.

Step I: adsorption. In step I, the adsorption of Nickel tetracarbonyl from synthesis gas was studied in a micro-tubular reactor. The set-up consisted of (i) a high-pressure gas mixing system whereby a gas is sourced from certified stock mixtures whereas water was added by bubbling the CO and/or $H_2$ stream through water prior to mixing with the other components, (ii) a pressure & temperature controlled tubular adsorber in which an accurately known quantity of crushed adsorbent of well defined size is uniformly placed and (iii) an analysis section whereby the composition of the in-going or outgoing gas mixture can be analyzed by both gas chromatography and infrared analysis. Infrared analysis was used to determine the quantity of metal carbonyls in the gas stream, based on the measurement of unique vibrations at 2057 cm$^{-1}$ for Ni(CO)$_4$ and 2012 cm$^{-1}$ and 2032 cm$^{-1}$ for Fe(CO)$_5$. The method permits the measurement of metal carbonyls in sour synthesis gas.

An accurately known quantity of activated carbon was placed in the adsorber. The reactor was flushed with nitrogen and residual adsorbates where removed by first heating up to 300° C. and subsequently cooling down in a nitrogen flow. The absorber conditions were equilibrated at 25° C. and 55 bara.

A synthesis gas representative for typical gasification operations, comprising CO (39 v %), $H_2$ (49.3 v %), $N_2$ (9.2 v %), $CO_2$ (2 v %), $H_2O$ (0.2 v %)as well as the following sulphur impurities $H_2S$ (0.3 v %), $CO_2$ (0.04 v %), nitrogen compounds HCN (0.01 v %, $NH_3$ 0.0015 v %) and 5 ppmv Ni(CO)$_4$ was contacted with the activated carbon in the adsorber. Removal of Nickel tetracarbonyl was demonstrated for 4 days during which 9.5 wt % of Ni(CO)$_4$ was deposited on the activated carbon used as a sorbent. After initial breakthrough, the content of Nickel tetracarbonyl at the adsorber outlet rose to the inlet level in approximately 20 hours after which removal of Nickel tetracarbonyl from the gas stream could not be observed anymore. At that stage, the total amount of $Ni(CO)_4$ deposited on the activated carbon was 10 wt %.

Step II: regeneration using inert gas. After saturation the Ni(CO)4 addition was shut-off and the synthesis gas was replaced by nitrogen. The loaded activated carbon sorbent was first heated up to 200° C. and subsequently cooled down to 25° C. with flowing nitrogen.

Step III: regeneration by CO-containing gas. At 25° C., the feed was switched back from nitrogen to a synthesis gas mixture comprising CO (40 v %), $H_2$ (50 v %) and $N_2$ (10 v %). The adsorber was re-heated up to 200° C. and subsequently cooled down in a synthesis gas atmosphere. Desorption of the Nickel tetracarbonyl that was adsorbed was observed by measuring elevated concentrations of Nickel tetracarbonyl e.g. Nickel tetracarbonyl concentrations as high as 60 ppmv at 150° C., at the outlet of the reactor. Determining the amount of Nickel tetracarbonyl in the out-going gas stream over a period of time (e.g. by integrating over time) indicated that the amount desorbed in Step III, following regeneration by CO-containing gas, equals the amount of Nickel tetracarbonyl that is deposited on the absorbent in the adsorption (Step I).

One can therefore conclude that heating up while pure nitrogen is flowing through the sorbent bed, as employed in Step II, is an ineffective method for regeneration of the sorbent.

EXAMPLE 2

The requirement of using a CO-containing gas for regeneration of the sorbent is further illustrated for a hydrophobic porous sorbent suitable for the removal of metal carbonyls from a synthesis gas phase.

The experimental set-up employed in this example is identical to the one used for example 1 and consisted of three consecutive stages:
Step I: adsorption.
Step II: regeneration using hydrogen.
Step III: second regeneration by CO-containing gas.

A quantity of crushed hydrophobic zeolite Y was placed in the absorber. The system was flushed and pressurised with nitrogen at 55 bara, heated up in a stream of nitrogen to 200° C. and subsequently cooled down to 120° C. The pressure was kept at 55 bara throughout the experiment.

Step I (adsorption). The adsorber feed was switched to a mixture comprising 5.5 volume % CO in $H_2$ as well as 5 ppmv of $Ni(CO)_4$. After equilibration the temperature was decreased to 25° C. Removal of $Ni(CO)_4$ from the reactor was observed using IR spectroscopy. After an equilibrium was established, taken to be the point in time whereby the Nickel tetracarbonyl content in the outgoing stream equalled that of the ingoing stream, the accumulated amount of Nickel tetracarbonyl on the absorbent was determined to be 2.5 wt % by monitoring the nickel tetracarbonyl content in the out-going gas stream in time.

Step II (regeneration by hydrogen). Next, the synthesis gas feed mixture was replaced by hydrogen. The absorber was heated up to 120° C. and subsequently cooled down to 25° C. in flowing hydrogen. Step III (regeneration using CO-containing gas).

Next, synthesis gas comprising CO (5.5 v %) and $H_2$ (balance) was fed into the system, after which the reactor was heated up to 120° C. and subsequently cooled down. Nickel tetracarbonyl concentrations in the outgoing stream illustrated the desorption of Nickel tetracarbonyl from the sorbent. Determining the Nickel tetracarbonyl content in the out-going gas stream in time indicates complete desorption of the amount deposited on the absorbent in the first step in this regeneration step (Step III).

Example 2 illustrates that all $Ni(CO)_4$ is only desorbed in the second heating step (Step III) wherein a CO-containing gas (synthesis gas) was used while regenerating with pure hydrogen as employed in the first heating step (Step II) is an ineffective method for regenerating the sorbent.

The experiments further illustrates that a reducing environment only (as provided by $H_2$) is not sufficient for full regeneration and that a CO-containing regeneration gas is required for achieving regeneration of the sorbent under mild conditions.

EXAMPLE 3

In this example the regeneration by inert gas is omitted from the procedure and the regenerative adsorption of Nickelcarbonyl over activated carbon is illustrated.

This experiment consists of two consecutive steps:
Step I: adsorption.
Step II: regeneration by CO-containing gas.

The experiment was conducted using in a micro-tubular reactor. The set-up consisted of (i) a high-pressure gas mixing system whereby a gas is sourced from certified stock mixtures, (ii) a pressure and temperature controlled tubular adsorber in which an accurately known quantity of crushed adsorbent of well defined size is uniformly placed and (iii) an analysis section whereby the composition of the in-going or out-going gas mixture can be analyzed by both gas chromatography and infrared analysis. The infrared analysis is used to determine the quantity of metal carbonyls in the gas stream and is based on the measurement of unique vibrations at 2057 $cm^{-1}$ for $Ni(CO)_4$ and 2012 $cm^{-1}$ and 2032 $cm^{-1}$ for $Fe(CO)_5$.

An accurately known quantity of activated carbon was placed in the adsorber. The reactor was flushed with nitrogen and residual adsorbates where removed by first heating up to 150° C. and subsequently cooling down with flowing synthesis gas comprising CO (40 v %, $H_2$ 50 v % and $N_2$ 10 v5). The absorber conditions were equilibrated at 45° C. and 55 bara.

Step I: adsorption. Next, 5 ppmv $Ni(CO)_4$ was added to the mixture employing a certified gas cylinder containing a mixture of nickel tetracarbonyl in CO and the resulting mixture was contacted with the activated carbon adsorbent. Removal of Nickel tetracarbonyl was demonstrated for 3 days during 9.4 wt % $Ni(CO)_4$ was deposited on the activated carbon used as a sorbent.

After initial breakthrough, the content of Nickel tetracarbonyl at the adsorber outlet rose to the inlet level in approximately 20 hours after which removal of Nickel tetracarbonyl from the gas stream could not be observed anymore. At that stage, the total amount of $Ni(CO)_4$ deposited on the activated carbon was 10.5 wt %.

Step II: regeneration by CO-containing gas. After saturation the $Ni(CO)_4$ addition was shut-off and the adsorber was heated up to 150° C. and subsequently cooled down in the said synthesis gas. Nickel tetracarbonyl e.g. Nickel tetracarbonyl concentrations as high as 60 ppmv at 110° C., at the outlet of the reactor were measured.

Determining the Nickel tetracarbonyl content in the out-going gas stream in time indicates that the amount desorbed in Step II, the regeneration by CO-containing gas, equals the amount of Nickel tetracarbonyl that is deposited on the absorbent in the preceding adsorption (Step I).

What is claimed is:

1. A process for the removal of metal carbonyl from a synthesis gas stream containing nickel tetracarbonyl, the process comprises the steps of:
   (a) adsorption of the nickel tetracarbonyl by contacting the synthesis gas stream with activated carbon to obtain activated carbon enriched in nickel tetracarbonyl and a synthesis gas stream depleted of nickel tetracarbonyl; and
   (b) thereafter, desorption of nickel tetracarbonyl by contacting the activated carbon enriched in nickel tetracarbonyl with a CO-containing gas comprising at least 0.5 volume % CO to obtain a regenerated activated carbon depleted of nickel tetracarbonyl and CO-containing gas enriched in nickel tetracarbonyl, wherein the temperature at which the nickel tetracarbonyl desorption takes place is higher than the temperature at which the nickel tetracarbonyl adsorption takes place.

2. A process according to claim 1, wherein the temperature at which metal carbonyl desorption takes place is in the range of from 5° C. to 175° C. higher than the temperature at which metal carbonyl adsorption takes place.

3. A process according to claim 1, wherein the temperature at which metal carbonyl desorption takes place is in the range of from 50 to 200° C.

4. A process according to claim 1, wherein the temperature of the CO-containing gas is in the range of from 60 to 210° C.

5. A process according to claim 1, wherein the CO-containing gas comprises in the range of from 1 to 100 volume % CO, based on the total CO-containing gas.

6. A process according to claim 1, wherein the metal carbonyl adsorption is performed at a pressure in the range of from 1 to 80 bara.

7. A process according to claim 1, wherein the synthesis gas stream depleted of metal carbonyl comprises less than 1 ppmv of metal carbonyl, based on the total synthesis gas stream.

8. A process according to claim 1, wherein the temperature at which metal carbonyl desorption takes place is in the range of from 5° C. to 175° C. higher than the temperature at which metal carbonyl adsorption takes place.

9. A process according to claim 1, wherein the temperature at which metal carbonyl desorption takes place is in the range of from 50 to 200° C.

10. A process for the removal of metal carbonyl from a synthesis gas stream containing iron pentacarbonyl, the process comprises the steps of:
    (a) adsorption of the iron pentacarbonyl by contacting the synthesis gas stream with a hydrophobic zeolite, having a water adsorption capacity of less than 25 kg $H_2O$/100 kg of dry adsorbent, to obtain hydrophobic zeolite enriched in iron pentacarbonyl and a synthesis gas stream depleted of iron pentacarbonyl; and
    (b) thereafter, desorption of iron pentacarbonyl by contacting the hydrophobic zeolite enriched in iron pentacarbonyl with a CO-containing gas comprising at least 0.5 volute % CO to obtain a regenerated hydrophobic zeolite depleted of iron pentacarbonyl and a CO-containing gas enriched in iron pentacarbonyl, wherein the temperature at which the iron pentacarbonyl desorption takes place is higher than the temperature at which the iron pentacarbonyl adsorption takes place.

11. A process according to claim 10, wherein the temperature at which metal carbonyl desorption takes place is in the range of from 5° C. to 175° C. higher than the temperature at which metal carbonyl adsorption takes place.

12. A process according to claim 10, wherein the temperature at which metal carbonyl desorption takes place is in the range of from 50 to 200° C.

13. A process for the removal of metal carbonyl from a synthesis gas stream, comprising iron pentacarbonyl and nickel tetracarbonyl, wherein the process comprises the steps of: adsorption of metal carbonyl by first contacting the synthesis gas stream at an adsorption temperature with a first layer of solid adsorbent, comprising hydrophobic zeolite, having a water adsorption capacity of less than 25 kg $H_2O$/100 kg of dry adsorbent, followed by contacting the synthesis gas stream with a second layer of solid adsorbent comprising activated carbon, wherein the first layer and the second layer are contained within a vessel; and
    thereafter, desorption of metal carbonyl by contacting at a desorption temperature the first layer of solid adsorbent and the second layer of solid adsorbent with a CO-containing as comprising at least 0.5 volume % CO, wherein the desorption temperature is greater than the adsorption temperature.

14. A process according to claim 13, wherein the temperature at which metal carbonyl desorption takes place is in the range of from 5° C. to 175° C. higher than the temperature at which metal carbonyl adsorption takes place.

15. A process according to claim 13, wherein the temperature at which metal carbonyl desorption takes place is in the range of from 50 to 200° C.

* * * * *